(12) United States Patent
Wilson

(10) Patent No.: X5015
(45) Date of Patent: Feb. 22, 1828

(54) BOILERS, STEAM,STONE COAL FOR

(76) Inventor: James G. Wilson

James G. Wilson, a Citizen of the United States.
Letters Patent
Dated February 22d 1825.

The Schedule referred to in these Letters Patent & making part of the same, containing a description in the words of the said James G. Wilson himself of his improvement in Steam Boilers for using Stone Coal.

---

Let a boiler be made of suitable materials for burning Stone Coal. Let the boiler be divided into three sections, let two sections lay on a horizontal plane parallel to each other, and at a sufficient distance apart to admit the coal, let the other section lay horizontally but directly over the other two representing the salient angle of a triangle & at a sufficient distance to admit the coal. These sections may be of a round, square or angular form; at the ends of each section there are openings so as to give a free communication of water from one to the other. On one or both sides of the boiler may be doors fastened to the upper section so as to open & admit fuel between the upper & lower sections, these doors are divided so as to feed the fire at different times, & when shut they are intended to confine the heat within the body of water. Under the two lower sections is a grate to lay the coal on, underneath the grate is a shaft with fans on it which revolves by having one or both ends attached to the machinery & when in operation the shaft by increasing or diminishing the velocity of its revolution will graduate the heat.

What I claim as my invention is the arrangement of the boiler the principle of spreading the coal between the length of the sections of the boiler and feeding the fire in sections, and the principle of creating a draft by shafts & fans, & the use to which this improvement is applied. New York 25th January 1825.

Witnesses,
Geo. White
[illegible] Hammond

James G. Wilson (250 words)

Received and Recorded June 23. 1841 — Examined; [illegible]

United States Patent
Patent No.: X5015
5015X
J. G. Wilson,
Steam-Boiler Furnace,
Patented Feb. 22, 1828.
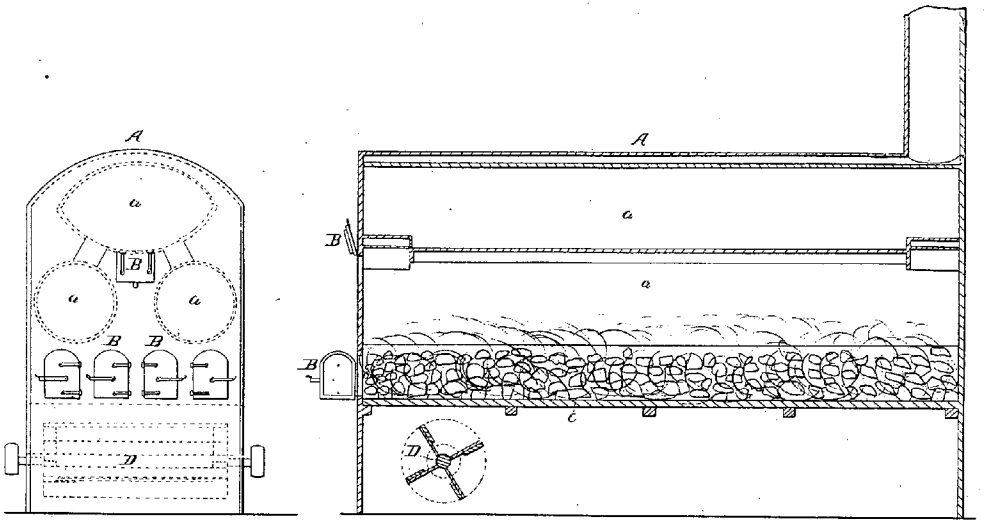
N. PETERS, PHOTO-LITHOGRAPHER, WASHINGTON, D. C.